US012617703B2

(12) United States Patent
Xu et al.

(10) Patent No.: US 12,617,703 B2
(45) Date of Patent: May 5, 2026

(54) MICRO-POLLUTED WATER BODY TREATMENT METHOD BASED ON AQUATIC FOREST SYSTEM CONSTRUCTION

(71) Applicant: SHANGHAI AQUATIC TECHNOLOGY CO., LTD., Shanghai (CN)

(72) Inventors: Houtao Xu, Shanghai (CN); Liqing Wang, Shanghai (CN); Xiaoyan Zheng, Shanghai (CN)

(73) Assignee: SHANGHAI AQUATIC TECHNOLOGY CO., LTD., Shanghai (CN)

( * ) Notice: Subject to any disclaimer, the term of this patent is extended or adjusted under 35 U.S.C. 154(b) by 426 days.

(21) Appl. No.: 18/268,323

(22) PCT Filed: Sep. 27, 2021

(86) PCT No.: PCT/CN2021/121002
§ 371 (c)(1),
(2) Date: Jun. 20, 2023

(87) PCT Pub. No.: WO2022/134709
PCT Pub. Date: Jun. 30, 2022

(65) Prior Publication Data
US 2024/0300835 A1      Sep. 12, 2024

(30) Foreign Application Priority Data
Dec. 24, 2020    (CN) .......................... 202011545943.4

(51) Int. Cl.
*C02F 3/32*          (2023.01)
*A01G 20/00*       (2018.01)
(Continued)

(52) U.S. Cl.
CPC .............. *C02F 3/327* (2013.01); *A01G 20/00* (2018.02); *A01G 33/00* (2013.01); *A01K 61/10* (2017.01);
(Continued)

(58) Field of Classification Search
CPC ...... C02F 3/327; C02F 3/34; C02F 2101/105; C02F 2101/16; C02F 2103/007;
(Continued)

(56) References Cited

U.S. PATENT DOCUMENTS

2009/0277829 A1    11/2009  He

FOREIGN PATENT DOCUMENTS

CN          101697712 A   *   4/2010
CN          102040284 A        5/2011
(Continued)

OTHER PUBLICATIONS

Machine-generated English translation of CN 105565584, generated on Oct. 14, 2025.*

(Continued)

*Primary Examiner* — Fred Prince
(74) *Attorney, Agent, or Firm* — Bayramoglu Law Offices

(57)                ABSTRACT

Provided is a micro-polluted water body ecological treatment method based on aquatic forest system construction. The method comprises the following steps: (1) investigating a pollution source of a micro-polluted water body; (2) estimating an annual pollution load of the micro-polluted water body which needs to be reduced; (3) designing aquatic animals and plants; and (4) constructing the aquatic animals and plants. By using a water body treated by means of the method in the present invention, an aquatic forest can be formed, and the synergistic effect, nutritional relationship, food chain relationship, etc., between organisms can be fully utilized for effective operation, such that not only can the (Continued)

combined benefits of water quality purification and water body resource utilization be achieved, but the organic unity of environmental protection, economic development, and the improvement of people's livelihood can also be realized.

16 Claims, 1 Drawing Sheet

(51) Int. Cl.

| | |
|---|---|
| *A01G 33/00* | (2006.01) |
| *A01K 61/10* | (2017.01) |
| *A01K 61/20* | (2017.01) |
| *A01K 61/51* | (2017.01) |
| *A01K 61/54* | (2017.01) |
| *A01K 61/59* | (2017.01) |
| *A01K 63/04* | (2006.01) |
| *C02F 3/34* | (2023.01) |
| *G06F 17/10* | (2006.01) |
| *G06Q 50/26* | (2024.01) |
| *C02F 101/10* | (2006.01) |
| *C02F 101/16* | (2006.01) |
| *C02F 103/00* | (2006.01) |

(52) U.S. Cl.
CPC .............. *A01K 61/20* (2017.01); *A01K 61/51* (2017.01); *A01K 61/54* (2017.01); *A01K 61/59* (2017.01); *A01K 63/04* (2013.01); *C02F 3/34* (2013.01); *G06F 17/10* (2013.01); *G06Q 50/26* (2013.01); *C02F 2101/105* (2013.01); *C02F 2101/16* (2013.01); *C02F 2103/007* (2013.01); *C02F 2209/001* (2013.01); *C02F 2209/08* (2013.01); *C02F 2209/14* (2013.01); *C02F 2209/16* (2013.01); *C02F 2209/22* (2013.01); *Y02A 40/80* (2018.01); *Y02A 40/81* (2018.01)

(58) Field of Classification Search
CPC ............ C02F 2209/001; C02F 2209/08; C02F 2209/14; C02F 2209/16; C02F 2209/22; A01G 20/00; A01G 33/00; A01K 61/10; A01K 61/20; A01K 61/51; A01K 61/54; A01K 61/59; A01K 63/04; G06F 17/10; G06Q 50/26; Y02A 40/80; Y02A 40/81
USPC ....... 210/602, 747.5, 170.01, 170.02, 170.09
See application file for complete search history.

(56) References Cited

FOREIGN PATENT DOCUMENTS

| | | | | | |
|---|---|---|---|---|---|
| CN | 202372498 | U | | 8/2012 | |
| CN | 102831297 | A | | 12/2012 | |
| CN | 103663672 | A | | 3/2014 | |
| CN | 105565584 | A | | 5/2016 | |
| CN | 106326405 | A | | 1/2017 | |
| CN | 108793410 | A | | 11/2018 | |
| CN | 111392869 | A | | 7/2020 | |
| CN | 112110546 | A | * | 12/2020 | .............. C02F 3/348 |
| CN | 112830579 | A | | 5/2021 | |
| FR | 2834284 | A1 | * | 7/2003 | .............. C02F 3/327 |
| JP | WO2008081554 | A1 | | 4/2010 | |
| KR | 101006170 | B1 | | 1/2011 | |

OTHER PUBLICATIONS

Machine-generated English translation of FR 2834284, generated on Oct. 14, 2025.*
Machine-generated English translation of CN 101697712, generated on Oct. 14, 2025.*
Machine-generated English translation of CN 112110546, generated on Oct. 14, 2025.*
Yegang Wu, Sponge City Design: Concept, Technology & Case Study (Revised Edition), 2019, pp. 142-145, Jiangsu Phoenix Science and Technology Press.
Environmental quality standards for surface water, China National Standards, 2002, pp. 1-9, General Administration of Environmental Protection of the People's Republic of China, and General Administration of Quality Supervision,Inspection and Quarantine of the People's Republic of China.

* cited by examiner

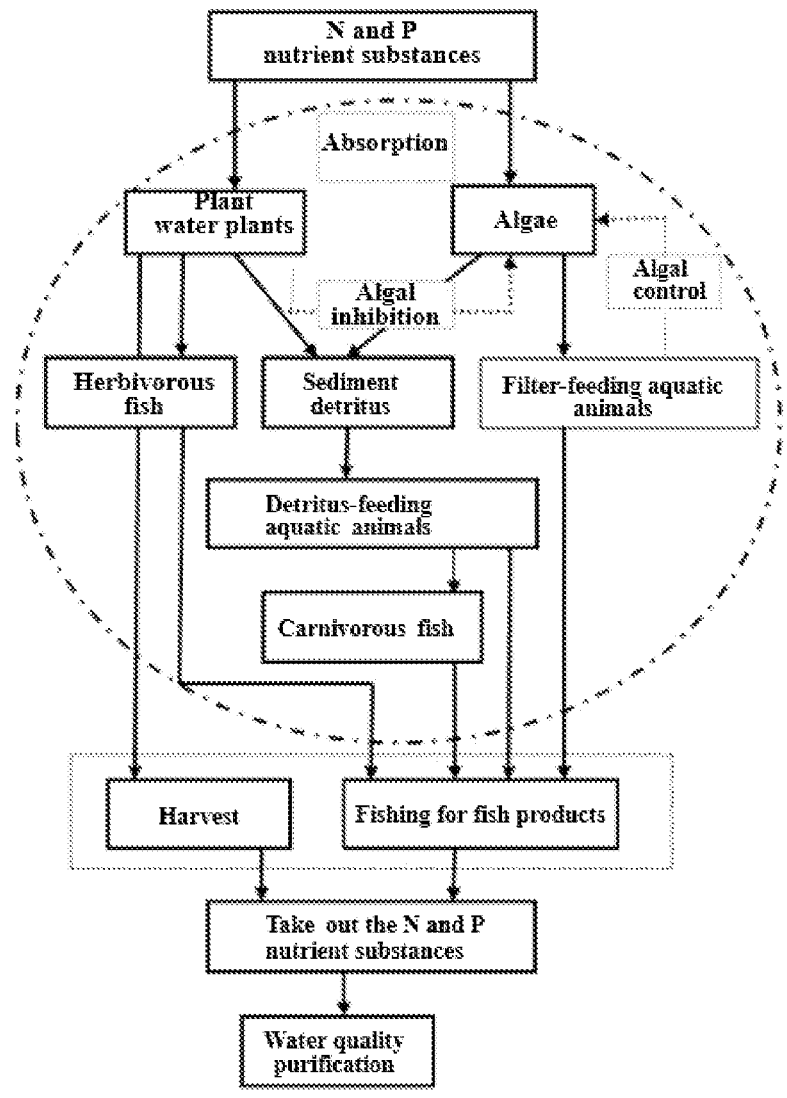

MICRO-POLLUTED WATER BODY TREATMENT METHOD BASED ON AQUATIC FOREST SYSTEM CONSTRUCTION

CROSS REFERENCE TO THE RELATED APPLICATIONS

This application is the national phase entry of International Application No. PCT/CN2021/121002, filed on Sep. 27, 2021, which is based upon and claims priority to Chinese Patent Application No. 202011545943.4, filed on Dec. 24, 2020, the entire contents of which are incorporated herein by reference.

TECHNICAL FIELD

The invention belongs to the field of fisheries and environmental ecology, and particularly relates to a micro-polluted water body treatment method based on aquatic forest system construction.

BACKGROUND ART

Nutrient salt pollution from nitrogen, phosphorus, etc. is the main factor that leads to eutrophication and algae bloom. Submerged plants have a good purification effect on nutrient salts such as nitrogen and phosphorus in water. On the one hand, submerged plants can directly absorb nutrient salts such as nitrogen and phosphorus. On the other hand, a large number of attaching organisms on the surface of submerged plants also play a purification function. Aquatic animals such as fish are an important part of a healthy aquatic ecosystem. As a primary producer of water body, the submerged plants provide food for the aquatic animals such as fish. By the combined action of producers (submerged plants), consumers (aquatic animals) and decomposers (microorganisms (natural reproduction)) to purify the water quality so as to transform the nutrient salts such as nitrogen and phosphorus in the water body into green clean fishing products.

Now, the problem to be solved is how to combine the ecological management of rivers and lakes with the high-quality development of fisheries to achieve the method of ecological management and long-term maintenance of rivers and lakes from protecting water by fishing and fish farming by water.

SUMMARY OF THE INVENTION

It is an object of the invention to provide a treatment method for a micro-polluted water body treatment method based on aquatic forest system construction, so as to realize the organic combination of the ecological treatment of the water body and the high-quality development of fisheries and achieve long-term maintenance, thereby forming a virtuous circulating aquatic forest.

In order to achieve the above-mentioned object, the invention provides a micro-polluted water body ecological treatment method based on aquatic forest system construction, the method comprising the following steps:

(1) investigating a pollution source of a micro-polluted water body;

(2) estimating an annual pollution load of the micro-polluted water body which needs to be reduced;

(3) designing aquatic animals and plants; and (4) constructing the aquatic animals and plants.

In some embodiments of the invention, the step (1) of investigating a pollution source of a micro-polluted water body comprises investigating a background pollution load, a sediment release pollution load, an overland runoff pollution load and/or a point source pollution load of the micro-polluted water body.

In some embodiments of the invention, the step (2) of estimating an annual pollution load of the micro-polluted water body which needs to be reduced comprises estimating an annual total pollution load of the micro-polluted water body and estimating an annual needed reduction of the pollution load of the micro-polluted water body.

In some embodiments of the invention, the step (3) of designing aquatic animals and plants comprises a submerged plant design and an aquatic animal design.

In some embodiments of the invention, the submerged plant design is a design of submerged plant species and areas according to the annual needed reduction of the pollution load of the micro-polluted water body.

In some embodiments of the invention, the pollution load is selected from nitrogen and phosphorus nutrient salt pollution loads.

In some embodiments of the invention, the submerged plant is selected from one or more of algal vascular plants, *Vallisneria, Potamogeton distinctus* A.Benn. or *Potamogeton crispus*.

In some embodiments of the invention, the aquatic animal design comprises one or more designs selected from:

(i) a design of releasing filter-feeding fish, (ii) a design of releasing herbivorous fish, (iii) a design of releasing carnivorous fish, (iv) a design of releasing scrape-feeding fish, (v) a design of releasing benthonic animals, and (vi) a design of releasing macrozooplankton.

In some embodiments of the invention, the (iii) design of releasing carnivorous fish is a releasing design of one or more fish selected from the group consisting of *Siniperca chuatsi, Lateolabrax japonicus, Elopichthys bambusa* and *Channaargus*.

In some embodiments of the invention, the (iv) design of releasing scrape-feeding fish is dominated by fish that control benthic and filamentous algae.

In some embodiments of the invention, the (v) design of releasing benthonic animals is a releasing design of one or more benthonic animals selected from the group consisting of spiral shells, mussels and shrimps.

In some embodiments of the invention, the (vi) design of releasing macrozooplankton is a *Daphnia magna* releasing design.

In some embodiments of the invention, the treatment method further comprises a step (5) of management and maintenance.

BRIEF DESCRIPTION OF THE DRAWINGS

FIG. 1 shows a technical principle of micro-polluted water body ecological treatment based on aquatic forest system construction.

DETAILED DESCRIPTION OF THE INVENTION

In the invention, the scientific and technical terms used herein have the meanings commonly understood by those skilled in the art, unless otherwise specified. Meanwhile, in order to better understand the invention, definitions and explanations of related terms are provided below.

As used herein, the term "pollution load" refers to the amount of pollutants discharged into an aqueous environment. The pollution load generally calculated by the product of discharge value and pollutant concentration, the present invention mainly refers to conventional pollutants such as nitrogen and phosphorus.

As used herein, the term "micropollution" refers to less kinds of pollution, less complex nature, and lower concentrations of pollutants, with the presence of only small amounts of nitrogen, phosphorus etc. nutrient salts, and in the absence of industrial wastewater pollution.

As used herein, the term "background pollution load" refers to the amount of pollutants originally present in a water body.

As used herein, the term "primary productivity" refers to the total amount of organic matter produced by autotrophic organisms such as phytoplankton, microorganisms, and the like in an aquatic ecosystem per unit of time, per unit of area, through photosynthesis or chemical interactions. It is generally expressed as the content (mass number) of organic carbon per day per square meter.

As used herein, the term "green clean fishing products" refers to fishery production and environmental protection coordinated to produce green pollution-free fishing products while protecting the environment.

As used herein, the term "sediment release pollution load" refers to the pollution load resulting from the gradual release of nutrients such as nitrogen, phosphorus and the like from sediment deposits into a water body. The pollution load released from the sediment is greatly influenced by the temperature and the pollution status of the sediment. The releasing amount of nitrogen is generally 0-50 mg/m$^2$·d, and the releasing amount of phosphorus is generally 0-5 mg/m$^2$·d. After the water body is desilted, the pollution load released from the sediment is generally regarded as 0.

As used herein, the term "point source pollution" refers to a pollution source having a fixed discharge point, which is commonly expressed as one point in a mathematical model to simplify the estimation, such as industrial wastewater and municipal sewage from the discharge port to the river and lake.

As used herein, the term "micro-polluted water body" refers to a type of water body that is complete in terms of pollution source control and interception, with relatively mild polluted water body such as overland runoff pollution and a small amount of point source pollution. In this context, the micro-polluted water body generally includes micro-polluted rivers, lakes, *lacus*, ponds and reservoirs.

As used herein, the term "water environmental capacity" refers to a maximum load of pollutants in a water body to meet the requirements of the quality of the water environment and is therefore also referred to as the water load or pollutant-holding capacity.

As used herein, the term "daily production of water column" refers to 1 day production of an entire column of water from the surface to the bottom of the water below 1 square meter of the water surface.

As mentioned above, the object of the invention is to form a virtuous circulating aquatic forest.

In order to achieve the above-mentioned object, the present invention provides a micro-polluted water body ecological treatment method based on aquatic forest system construction, the method including the following steps:

(1) investigating a pollution source of a micro-polluted water body;

(2) estimating an annual pollution load of the micro-polluted water body which needs to be reduced;

(3) designing aquatic animals and plants; and (4) constructing the aquatic animals and plants.

In some embodiments of the invention, the step (1) of investigating a pollution source of a micro-polluted water body comprises investigating a background pollution load, a sediment release pollution load, an overland runoff pollution load and/or a point source pollution load of the micro-polluted water body.

In some embodiments of the invention, the step (2) of estimating an annual pollution load of the micro-polluted water body which needs to be reduced comprises estimating an annual total pollution load of the micro-polluted water body and estimating an annual needed reduction of the pollution load of the micro-polluted water body.

In some embodiments of the invention, the annual total pollution load of the micro-polluted water body is estimated according to Formula (1):

$$P_t = P_b + P_d + P_m + \sum_{i=1}^{n} P_i \tag{1}$$

in Formula (1), $P_t$ is the annual total pollution load of micro-polluted water, $P_b$ is a background pollution load of micro-polluted water body, $P_d$ is an annual sediment release pollution load of the micro-polluted water body, $P_m$ is an annual overland runoff pollution load of the micro-polluted water body, $P_i$ is an annual pollution load of an $i^{th}$ point source of the micro-polluted water body;

n is the number of point source pollution.

In some embodiments of the invention, the annual needed reduction of the pollution load of the micro-polluted water body is estimated according to Formula (2):

$$P_C = P_t - W_{ec} \tag{2}$$

in Formula (2), $P_c$ is the annual needed reduction of the pollution load of the micro-polluted water body, $W_{ec}$ is a water environment capacity.

In some embodiments of the present invention, the step (3) of designing aquatic animals and plants comprises a submerged plant design and an aquatic animal design, wherein, (a) Submerged Plant Design The submerged plant design is a design of submerged plant species and areas according to the annual needed reduction of the pollution load of the micro-polluted water body.

In some embodiments of the invention, the species and area of submerged plants are determined according to the removal effects of different species of submerged plant systems on nutrient salts such as nitrogen and phosphorus combined with seasonal growth characteristics of the plants.

In some embodiments of the invention, the submerged plant is selected from one or more of algal vascular plants, *Vallisneria, Potamogeton distinctus* A.Benn. or *Potamogeton crispus.*

In some embodiments of the invention, the algal vascular plant is selected from one or more of charophytes, *Cerato-*

5

*phyllum demersum* L., *Hydrilla verticillata, Najas minor* All., *Myriophyllum verticillatum* L. or *Elodea canadensis* Michx.;

In some embodiments of the invention, the *Vallisneria* is selected from one or more of dwarf type and cold-resistant *vallisneria, Vallisneria spinulosa* or *Vallisneria natans*.

In some embodiments of the invention, the *Potamogeton distinctus* A.Benn. is selected from one or more of *Potamogeton malaianus* or *Potamogeton pectinatus*.

The nutrient salt pollution load is estimated according to Formula (3):

$$N_r = S_p \times (x_1 x_2 \ \ldots \ x_n) \begin{pmatrix} N_1 \\ N_2 \\ \vdots \\ N_n \end{pmatrix} \tag{3}$$

in Formula (3), $N_r$ is an annual nutrient removal amount g/a by the submerged plants, $S_p$ is a total area $m^2$ of the submerged plants, $x_n$ is a proportion of a submerged plant n, $N_n$ is annual nutrient removal capacity $g/m^2 \cdot a$ by the submerged plant n for nutrient salts.

In some embodiments of the invention, the pollution load refers to a nitrogen or phosphorus nutrient salt pollution load.

See Table 1 for the removal capacity of various types of submerged plants for nitrogen and phosphorus.

TABLE 1

| Removal rates of nitrogen and phosphorus by various submerged plants | | | |
|---|---|---|---|
| | | Removal amount (mg/m² · d) | |
| Month | Plant species | Total Nitrogen (TN) | Total Phosphorus (TP) |
| April to October | Dwarf type and cold-resistant vallisneria | 89.2 | 17.7 |
| | Charophytes | 50.2 | 31.5 |
| | Ceratophyllum demersum L. | 91.2 | 37.2 |
| | Potamogeton malaianus | 118.9 | 32.7 |
| | Vallisneria spinulosa | 125.7 | 31.5 |
| | Potamogeton pectinatus | 87.8 | 28.6 |
| | Vallisneria natans | 102.1 | 23.2 |
| | Hydrilla verticillata | 138.4 | 35.2 |
| | Najas minor All. | 56.3 | 45.3 |
| | Myriophyllum verticillatum L. | 106.2 | 30.2 |
| November to Next March | Dwarf type and cold-resistant vallisneria | 22.5 | 12.2 |
| | Ceratophyllum demersum L. | 41.3 | 13.5 |
| | Potamogeton pectinatus | 26.5 | 19.5 |
| | Potamogeton crispus | 43.5 | 13.8 |
| | Myriophyllum verticillatum L. | 56.2 | 22.5 |
| | Elodea canadensis Michx. | 48.9 | 15.5 |
| Average | | 75.31 | 25.63 |

6

(b) Aquatic Animal Design:

The species and quantity of aquatic animals are designed according to the primary productivity of water body and submerged plant biomass.

In some embodiments of the invention, the aquatic animal design comprises one or more designs selected from:

(i) a design of releasing filter-feeding fish;

(ii) a design of releasing herbivorous fish;

(iii) a design of releasing carnivorous fish;

(iv) a design of releasing scrape-feeding fish;

(v) a design of releasing benthonic animals; and (vi) a design of releasing macrozooplankton.

In some embodiments of the invention, the (i) design of releasing filter-feeding fish estimates the releasing quantity of filter-feeding fish based on phytoplankton biomass and micro-polluted water body capacity.

In some embodiments of the invention, only *Hypophthalmichthys molitrix* is released for the intake. *Hypophthalmichthys molitrix* intakes algae above 100 m. The releasing amount of *Hypophthalmichthys molitrix* is estimated according to the following formula.

The primary productivity of rivers and lakes is analyzed by determining dissolved oxygen with black and white bottles. According to the principle, the white bottle and the black bottle filled with water sample are hung in different water layers, exposed for 24 hours. The phytoplankton in the black bottle can only perform respiration due to no light. With the white bottle being completely under light, the phytoplankton in the bottle can perform photosynthesis. Generally, the dissolved oxygen in the white bottle will increase, and the dissolved oxygen in the black bottle will decrease. The water productivity is estimated by the change of the dissolved oxygen in the black and white bottles.

The total productivity of black and white bottles is estimated according to Formula (4):

$$P_G = DO_W - DO_B \tag{4}$$

in Formula (4), $P_G$ is a total $O_2$ productivity mg/L of black and white bottles, $DO_W$ is a dissolved oxygen content mg/L in the white bottle, $DO_B$ is a dissolved oxygen content mg/L in the black bottle.

The $O_2$ net productivity of the black and white bottles is estimated according to Formula (5), $$P_N = DO_W - DO_I \tag{5}$$

in Formula (5), $P_N$ is an $O_2$ net productivity mg/L of the black and white bottles, $DO_I$ is an initial dissolved oxygen content mg/L in the black and white bottles.

The $O_2$ daily productivity $g/m^2$ d of water column is estimated according to Formula (6), $$W_P = \sum_{i=1}^{n-1} \frac{P_{Ni} + P_{Ni+1}}{2} (D_{i+1} - D_i) \tag{6}$$

in Formula (6)

$W_P$ is the $O_2$ daily production g/m²·d of water column;

$P_{Ni}$ is the net primary productivity g/m³·d of an $i^{th}$ layer, $D_i$ is a depth m of the $i^{th}$ layer, n is a sampling level.

The total $O^2$ productivity g of the water body is estimated according to Formula (7), $$P_{GH} = W_P \times S_H \times D_G \times 0.75 \qquad (7)$$

in Formula (7), $P_{GH}$ is the total 02 productivity g of the water body, $S_H$ is an area m² of the water body, $D_G$ is the days of fish growth, counted as 270 days.

The feeding ability of phytoplankton to *Hypophthalmichthys molitrix* is estimated according to Formula (8), $$F_{sc} = P_{GH} \times (P_N/P_G) \times R_P \times T_O \qquad (8)$$

in Formula (8), $F_{SC}$ is the feeding ability of phytoplankton to *Hypophthalmichthys molitrix*, $R_P$ is a phytoplankton utilization rate of fish, generally taken as 0.5, $T_O$ is a heat equivalent of oxygen, 14.686 KJ/g.

The fish yield potential of *Hypophthalmichthys molitrix* is estimated according to Formula (9), $$F_L = F_{SC} \times E_L \times (1/C) \times 10^{-6} \qquad (9)$$

in Formula (9), $F_L$ is a fish yield potential of *Hypophthalmichthys molitrix* in tons (t), $E_L$ is a conversion rate of *Hypophthalmichthys molitrix* to phytoplankton, taken as 0.032, C is a heat equivalent of 1 g fresh meat, 5.021 KJ.

In some embodiments of the invention, the (ii) design of releasing herbivorous fish determines a suitable stocking amount of herbivorous fish according to the law of aquatic weed propagation and the intake rate of *Ctenopharyngodon idella*.

In some embodiments of the invention, the released herbivorous fish are primarily *Ctenopharyngodon idella* and *Parabramis pekinensis*.

In some embodiments of the invention, the releasing quantity of *Ctenopharyngodon idella* and *Parabramis pekinensis* is estimated according to the following formula.

The submerged plant biomass in March and June is calculated with reference to an empirical model of submerged plant biomass:

$$\text{June: } W_{b6} = -3536 + 7900.6 M_{SD}/M_{DP} \qquad (10)$$

$$\text{March: } W_{b3} = -3149 + 4854.6 M_{SD}/M_{DP} \qquad (11)$$

In Formulas (10) and (11):

$W_{b3}$ is a biomass (wet weight, g/m²) of submerged plants in March;

$W_{b6}$ is a biomass (wet weight, g/m²) of submerged plants in June;

$M_{SD}/M_{DP}$ is a ratio of transparency to water depth for the corresponding month.

In some embodiments of the invention, the maximum intake of herbivorous fish is measured with reference to Table 2:

TABLE 2

| Maximum intake of herbivorous fish | | |
| --- | --- | --- |
| Submerged plant species | Maximum intake of *Ctenopharyngodon idella* | Maximum intake of *Parabramis pekinensis* |
| *Vallisneria* | $F_M = 1.923 X^{0.6489}$ | $F_M = 0.8991 X^{0.4269}$ |
| *Hydrilla verticillata* | $F_M = 2.0037 X^{0.6390}$ | $F_M = 7.6604 X^{0.3580}$ |
| *Potamogeton crispus* | $F_M = 1.762 X^{0.5236}$ | $F_M = 0.8914 X^{0.5554}$ |

In Table 2, $F_M$ is a daily intake g/d of fish,

X is a body weight kg of the fish.

$$A_F = S \times (W_{b6} - W_{b3}) \times 0.3/(F_M \times D_G) \qquad (12)$$

In Formula (12), $A_F$ is a releasing quantity of herbivorous fish, calculated by the number of fish;

S is a planting area m² of the submerged plants;

$D_G$ is the days of herbivorous fish growth, counted as 270 days.

The releasing ratio of *Parabramis pekinensis* to *Ctenopharyngodon idella* is about 10:1.

In some embodiments of the invention, the (iii) design of releasing carnivorous fish is a releasing design of one or more fish selected from the group consisting of *Siniperca chuatsi, Lateolabrax japonicus, Elopichthys bambusa* and *Channaargus*.

In some embodiments of the invention, the releasing quantity of the carnivorous fish is 10-15 fish per mu;

In some embodiments of the invention, the (iv) design of releasing scrape-feeding fish is dominated by fish that control benthic and filamentous algae.

In some embodiments of the invention, *Xenocypris microlepis* is primarily released. Preferably, the releasing quantity of the *Xenocypris* is 35-40 fish per mu;

In some embodiments of the invention, the (v) design of releasing benthonic animals is a releasing design of one or more benthonic animals selected from the group consisting of spiral shells, mussels and shrimps.

In some embodiments of the invention, the spiral shell is *Bellamya*. Preferably, the releasing quantity of *Bellamya* is 80-160 per m².

In some embodiments of the invention, the releasing quantity of the mussel is 4-5/m² (the area is a planting area of the submerged plants).

In some embodiments of the invention, the releasing quantity of freshwater shrimps is 0.5-5 g/m².

In some embodiments of the invention, the (vi) design of releasing macrozooplankton is a *Daphnia magna* releasing design.

The construction of aquatic forest system adopts the classical biological operation theory, that is to control the algae within 50 m in diameter in the water body by adding a filter-feeding zooplankton, *Daphnia magna* to improve the transparency of the water body. In some embodiments of the invention, the releasing density of *Daphnia magna* is 10-30/L.

FIG. 1 shows the technical principle of micro-polluted water body ecological treatment based on aquatic forest system construction. According to the current situation of water body, water environmental capacity and expected ecological objectives, and based on the principle of water ecological balance, we construct submerged vegetation firstly, from the stem grass at the deep water area to the basal grass in the shallow water area, and then to the floating-leaved plants and emergent plants at the waterfront, forming a staggered and orderly forest system with a similar land-based arbor-shrub-grass collocation. In this system, we naturally or artificially introduce filter-feeding aquatic animals (such as *Hypophthalmichthys molitrix*, *Daphnia magna*, etc.), detritus-feeding aquatic animals (such as freshwater shrimps, spiral shells, etc.), carnivorous fish (such as *Siniperca chuatsi*, *Lateolabrax japonicus*, *Elopichthys bambusa*, *Channaargus*, etc.) gradually, and have restricted stocking of herbivorous fish (such as *Ctenopharyngodon idella* and *Parabramis pekinensis*) to achieve water quality purification through the top of the nutrient cascade, forming a grass-type aquatic ecosystem with the leading role of producers and the harmonious coexistence of consumers and decomposers.

Practice has proved that the water quality treated by the method of the invention can be maintained in the national surface water Class III-IV (GB3838-2002) for a long period of time. Meanwhile, a certain amount of high-quality aquatic products can be produced annually for subsidizing the expense of management and maintenance. The cost of construction and operation is low. The treated water body forms an aquatic forest. The synergistic effect, nutritional relationship, food chain relationship, etc., between organisms can be fully utilized for effective operation, such that not only can the combined benefits of water quality purification and water body resource utilization be achieved, but the organic unity of environmental protection, economic development, and the improvement of people's livelihood can also be realized.

For purposes of clarity and conciseness, features are described herein as part of the same or separate embodiments. However, it will be understood that the scope of the invention may include some embodiments having a combination of all or some of the features described.

Embodiment 1: Ecological Management Project of Hefei Baiyan Lake

Baiyan Lake is located in Hefei City High-tech Zone, and occupies about 1.67 km$^2$, in which the water surface area is about 0.69 km$^2$ (about 1035 mu) and the catchment area is about 12.5 km$^2$. As a typical shallow lake, the average water depth of Baiyan Lake is 3-4 m, and the maximum water depth is only 6-7 m. With the rapid economic and social development in Hefei City, the Baiyan Lake has been increasingly polluted, with the degree of eutrophication intensified, the aquatic ecosystem destroyed in different degrees, the algae massively reproduced, the transparency of water body decreased, and the aquatic plants gradually disappeared, which seriously affect its ecological and landscape functions. Since June 2014, the ecological treatment of Baiyan Lake has been carried out. The treatment target is that the main water quality indexes meet the national standard of surface water above class IV (TN≤1.5 mg/L, TP≤0.1 mg/L, COD≤30 mg/L, BOD$_5$≤6 mg/L, NH$_3$—N<1.5 mg/L, average dissolved oxygen ≥3 mg/L), and the water body is clear (transparency ≥1.2 m).

The main work flow of treatment engineering is as follows: pollution source investigation, pollution load estimation, aquatic animal and plant design, aquatic animal and plant construction, and management and maintenance.

1. Investigation of Pollution Sources of Baiyan Lake

According to the investigation, the pollution sources of Baiyan Lake are the background pollution load, the overland runoff and a small amount of point source pollution.

2. Pollution Load Estimation of Baiyan Lake

According to the water quality of the Baiyan Lake before treatment, the annual average of total nitrogen is 2 mg/L·a (i.e., 2 g/m$^3$·a), and the annual average of total phosphorus is 0.4 mg/L·a (i.e., 0.4 g/m$^3$·a). As the water volume of Baiyan lake is 2.58 million m$^3$, the total nitrogen of P$_b$ total phosphorus=22 g/m$^3$·a×2580000 m$^3$×10$^{-6}$ t/g=5.16 t, and P$_b$ total phosphorus=0.4 g/m$^3$·a×2580000 m$^3$×10$^{-6}$ t/g≈1.03 t.

Since the Baiyan Lake has been dredged, the P$_d$ value is 0.

The rain-collecting area of Baiyan Lake is 11.81 km$^2$, in which the residential land accounts for 20% (annual average of total nitrogen of pollution load is 5.8 g/m$^3$·a, and annual average of total phosphorus is 1.5 g/m$^3$·a), the commercial land accounts for 10% (annual average of total nitrogen of pollution load is 13.1 g/m$^3$·a, and annual average of total phosphorus is 3.8 g/m$^3$a), the industrial land accounts for 20% (annual average of total nitrogen of pollution load is 12.2 g/m$^3$·a, and annual average of total phosphorus is 3.1 g/m$^3$·a), and the green land accounts for 50% (annual average of total nitrogen of pollution load is 2.1 g/m$^3$·a, and annual average of total phosphorus is 0.4 g/m$^3$·a). The surface runoff received by the Baiyan Lake for direct input into the lake is about 2 million m$^3$/a, and the initial rainwater interception is 30%, the annual pollution P$_m$ total nitrogen produced by the overland runoff is =2000000 m$^3$×(1−0.3)×(0.2×5.8+0.1×13.1+0.2×12.2+0.5×2.1) g/m$^3$·a×10$^{-6}$ t/g≈8.34 t/a (ton/year), and P$_m$ total phosphorus=2000000 m$^3$×(1−0.3)×(0.2×1.5+0.1×3.8+0.2×3.1+0.5×0.4) g/m$^3$·a×10$^{-6}$ t/g≈2.10 t/a.

The point source pollution is mainly inflow. The annual inflow quantity of Baiyan Lake is about 2.15 million m$^3$. If the inflow quality is 2 g/m$^3$·a for total nitrogen annual average and 0.4 g/m$^3$·a for total phosphorus annual average, then P$_i$ total nitrogen=2150000 m$^3$×2 g/m$^3$×10$^{-6}$ t/g=4.3 t/a, and P$_i$ total phosphorus=2150000 m$^3$×0.4 g/m$^3$×10$^{-6}$ t/g=0.86 t/a.

If the annual pollution load of Baiyan Lake is estimated according to the formula (1), the total annual pollution load of the water body has P$_t$ total nitrogen=5.16+8.34+4.3=17.8 t/a and P$_t$ total phosphorus=1.03+2.10+0.86=3.99 t/a.

According to the target of lake treatment that the annual average total nitrogen is ≤1.5 mg/L·a (i.e., 1.5 g/m$^3$) and the annual average total phosphorus is 0.3 mg/L·a (i.e., 0.3 g/m$^3$), the water environmental capacity includes:

$$\text{Total nitrogen } W_{ec} =$$
$$1.5 \text{ g/m}^3 \cdot a \times (2580000 + 2000000 + 2150000) \text{ m}^3 \times 10^{-6} \text{ t/g} \approx 10.09 \text{ t/a}$$

$$\text{Total phosphorus } W_{ec} =$$
$$0.3 \text{ g/m}^3 \cdot a \times (2580000 + 2000000 + 2150000) \text{ m}^3 \times 10^{-6} \text{ t/g} \approx 2.02 \text{ t/a}$$

According to Formula (2), the annual needed reduction of Baiyan Lake includes:

Total nitrogen $P_c = 17.8 - 10.09 = 7.71$ t/a

Total phosphorus $P_c = 3.99 - 2.02 = 1.97$ t/a

3. Aquatic Animal and Plant Design

3.1 Aquatic Plant Design

According to the annual needed reduction of pollution load, the species and area of aquatic plants are designed. According to Table 1, as the average removal amount of nitrogen by submerged plants is about 75.31 mg/m²·d, and the average removal amount of phosphorus is about mg/m²·d, the layout area of submerged plants is $(7.71×10^9$ mg/a)/(75.31 mg/m²·d×365d/a)≈280485 m² according to the total nitrogen, and the layout area is $(1.97×10^9$ mg/a)/(25.63 mg/m²·d×365 d/a)≈210584 m² according to the total phosphorus.

According to the water depth of Baiyan Lake and the growth law of submerged plants, the submerged plants are arranged in a community manner with an area of 259243 m², and the specific arrangement is as follows:

> Community 1: *Ceratophyllum demersum* L. and *Vallisneria spinulosa* 1: 4 (proper planting time: May to August);
>
> Community 2: *Hydrilla verticillata* and *Vallisneria spinulosa* 2: 3 (proper planting time: May to August);
>
> Community 3: Dwarf type and cold-resistant *vallisneria* (proper planting time: March to October);
>
> Community 4: *Ceratophyllum demersum* L. and *Hydrilla verticillata* 1: 4 (proper planting time: May to August);
>
> Community 5: *Vallisneria spinulosa* and *Myriophyllum spicatum* 4: 1 (proper planting time: May to October);
>
> Community 6: *Vallisneria spinulosa* and *Potamogeton crispus* 3: 2 (proper planting time: May to October);
>
> Community 7: *Vallisneria spinulosa* and *Potamogeton malaianus* 3: 2 (proper planting time: May to August);
>
> Community 8: *Najas marina* and *Hydrilla verticillata* 1: 4 (proper planting time: May to August).

According to Formula (3), the amount of nitrogen and phosphorus removal by the plants in Baiyan Lake is calculated (Table 3), and the removal of influence salt is satisfied after plant arrangement.

3.2. Aquatic Animal Design:

(I) Releasing Filter-Feeding Fish: *Hypophthalmichthys molitrix*

According to phytoplankton biomass, basic water parameters (water capacity 2.85 million m³), and the average water depth of 4 m, the $O_2$ daily productivity of water column is calculated by using the black and white bottle method and Formulas (4)-(6). In June 2014, five water layers (0 m, 1 m, 2 m, 3 m and 4 m) were separated by black and white bottles in Baiyan Lake. After 24 h, the contents of dissolved oxygen in each water layer were as follows (Table 4):

TABLE 4

| Dissolved oxygen content of each water layer (mg/L · d) | | | | |
|---|---|---|---|---|
| Water layer | Depth | Original | White bottle | Black bottle |
| First layer | 0 m | 7.55 | 12.36 | 3.61 |
| Second layer | 1 m | 6.08 | 9.59 | 3.21 |
| Third layer | 2 m | 5.30 | 8.34 | 2.83 |
| Fourth layer | 3 m | 4.89 | 7.79 | 2.53 |
| Fifth floor | 4 m | 3.90 | 6.08 | 2.12 |

According to Formula (4), it is calculated that $P_G$=(12.36–3.61) mg/L·d+(9.59–3.21) mg/L·d+(8.34–2.83) mg/L·d+(7.79–2.53) mg/L·d+(6.08–2.12) mg/L·d=29.86 mg/L·d.

According to Formula (5), it is calculated that $P_N$=(12.36–7.55) mg/L·d+(9.59–6.08) mg/L·d+(8.34–5.30) mg/L·d+(7.79–4.89) mg/L·d+(6.08–3.90) mg/L·d=16.44 mg/L.

According to Formula (6), it is calculated that $W_p$=(4.81+3.51) mg/L·d÷2×(1–0) m+(3.51+3.04) mg/L·d÷2×(2–1)+(3.04+2.9) mg/L·d÷2×(3–2) m+(2.9+2.18 mg/L·d÷2×(4–3) m=12.965 g/m²·d.

According to Formula (7), it is calculated that $P_{GH}$=12.965 g/m²·d×690000 m²×270 d×0.75=1811534625 g.

According to formula (8), The feeding ability of phytoplankton to *Hypophthalmichthys molitrix* is calculated, $F_{SC}$=1811534625 g×(16.44 mg/L/29.86 mg/L)×0.5×14.686 KJ/g≈7323727511 KJ.

According to Formula (9), the fish yield potential of *Hypophthalmichthys molitrix* is calculated, $F_L$=7323727511

TABLE 3

| Biomass of submerged plants | | | |
|---|---|---|---|
| Submerged plant | Layout area (m²) | Nitrogen absorbing capacity (kg/a) | Phosphorus absorbing capacity (kg/a) |
| *Hydrilla verticillata* | 74800 m² | 74800 m² × 138.4 mg/m² · d × 244 d/a × 10⁻⁶ kg/mg = 2525.96 kg/a | 74800 m² × 35.2 mg/m² · d × 244 d/a × 10⁻⁶ kg/mg = 642.44 kg/a |
| Dwarf type and cold-resistant vallisneria | 9722 m² | (9722 m² × 89.2 mg/m² · d × 244 d/a + 9722 m² × 22.5 mg/m² · d × 121 d/a) × 10⁻⁶ kg/mg = 238.07 kg/a | (9722 m² × 17.7 mg/m² · d × 244 d/a + 9722 m² × 12.2 mg/m² · d × 121 d/a) × 10⁻⁶ kg/mg = 56.34 kg/a |
| *Potamogeton crispus* | 6694 m² | 6694 m²/43.5 mg/m² · d × 244 d/a × 10⁻⁶ kg/mg = 71.05 kg/a | 6694 m² × 13.8 mg/m² · d × 244 d/a × 10⁻⁶ kg/mg = 22.54 kg/a |
| *Vallisneria spinulosa* | 126270 m² | 126270 m² × 125.7 mg/m² · d × 244 d/a × 10⁻⁶ kg/mg = 3872.80 kg/a | 126270 m² × 31.5 mg/m² · d × 244 d/a × 10⁻⁶ kg/mg = 970.51 kg/a |
| *Ceratophyllun demersum* L. | 10560 m² | (10560 m² × 91.2 mg/m² · d × 244 d/a + 10560 m² × 41.3 mg/m² · d × 121 d/a) × 10⁻⁶ kg/mg = 287.76 kg/a | (10560 m² × 37.2 mg/m² · d × 244 d/a + 10560 m² × 13.5 mg/m² · d × 121 d/a) × 10⁻⁶ kg/mg = 113.10 kg/a |
| *Potamogeton malaianus* | 21608 m² | 21608 m² × 118.9 mg/m² · d × 244 d/a × 10⁻⁶ kg/mg = 626.88 kg/a | 21608 m² × 32.7 mg/m² · d × 244 d/a × 10⁻⁶ kg/mg = 172.41 kg/a |
| *Najas minor All.* | 6564 m² | 6564 m² × 56.3 mg/m² · d × 244 d/a × 10⁻⁶ kg/mg = 90.17 kg/a | 6564 m² × 45.3 mg/m² · d × 244 d/a × 10⁻⁶ kg/mg = 72.55 kg/a |
| *Myriophyllum spicatum* | 3024 m² | (3024 m² × 106.2 mg/m² · d × 244 d/a + 3024 m² × 56.2 mg/m² · d × 131 d/a) × 10⁻⁶ kg/mg = 100.62 kg/a | (3024 m² × 30.2 mg/m² · d × 244 d/a + 3024 m² × 22.5 mg/m² · d × 121 d/a) × 10⁻⁶ kg/mg = 30.52 kg/a |
| Total | 259243 m² | 7813.32 kg/a | 2080.41 kg/a |

KJ×0.032×(1/5.021 KJ/g)×10$^{-6}$ t/g≈46.67 t. Therefore, the releasing amount of *Hypophthalmichthys molitrix* is 46.7 t.

(ii) Herbivorous fish releasing: *Ctenopharyngodon idella* and *Parabramis pekinensis*

Transparency and water depth of Baiyan Lake in March are measured at 2 m and 3 m (dry season), respectively. The transparency and water depth in June are measured at 2 m and 4 m, respectively.

The plant biomass in June and March is calculated according to Formulas (10) and (11), $W_{b6}$=−3536+7900.6×2 m/4 m=414.3 g/m$^2$, $W_{b3}$=−3149+4854.6×2 m/3 m=87.4 g/m$^2$.

Considering the rapid growth of *Hydrilla verticillata*, the stocked fish are mainly *Parabramis pekinensis*, and the intake of *Parabramis pekinensis* is calculated according to Table 2, with the weight measured at 2 kg/fish, $F_M$=7.6604× 2$^{0.3580}$=22.78 g/d.

The releasing quantity of herbivorous fish is calculated according to Formula (12), $A_f$=259243×(414.3−87.4)×0.3/ (22.78×270)=9590 fish. Among them, there are 8720 *Parabramis pekinensis* and 870 *Ctenopharyngodon idella*.

(iii) Carnivorous fish releasing: *Siniperca chuatsi, Lateolabrax japonicus, Elopichthys bambusa Siniperca chuatsi, Lateolabrax japonicus* and *Elopichthys bambusa* are designed to release 12410 fish, including *Elopichthys bambusa* (20% of the total), 2480 fish.

(iv) Scrape-feeding fish releasing: *Xenocypris*
the releasing quantity of the *Xenocypris* is 36,400.

(V) Benthonic animals releasing: *Bellamya*, mussels, and freshwater shrimps

If the number of 1 kg *Bellamya* is 500, the releasing quantity of *Bellamya*=80/m$^2$×259243 m$^2$/500/kg×10$^{-3}$ t/kg≈41.47 t.

If the number of 1 kg mussel is 20, the releasing quantity of the mussel=4/m$^2$×259243 m$^2$/20/kg×10$^{-3}$ t/kg≈51.85 t.

According to the freshwater shrimps releasing density of 3.65 g/m$^2$, the releasing quantity of freshwater shrimps=3.65 g/m$^2$×259233 m$^2$×10$^{-6}$ t/kg≈0.946 t.

(vi) Macrozooplankton releasing: *Daphnia magna*
The releasing quantity of *Daphnia magna*=10/L× 2580000000 L=2.58×10$^{10}$ 4. Aquatic animal and plant construction The cultivation of submerged plants in the lake area was carried out in July 2015, and the cultivation was completed in October 2015.

The scrape-feeding fish including *Xenocypris* was released in December 2015. *Daphnia magna* was released in March 2016. In April 2016, the spiral shells, mussels and shrimps were released.

In June 2016, the filter-feeding fish including *Hypophthalmichthys molitrix* was released. The herbivorous fish, *Ctenopharyngodon idella* and *Parabramis pekinensis*, were released in July 2016. The carnivorous fish including *Siniperca chuatsi, Lateolabrax japonicus, Elopichthys bambusa* were released in November 2016.

5. Management and Maintenance

In July 2016, management and maintenance period was started, including water quality, biological monitoring, water surface sanitation, multiple stocking and multiple fishing and other aspects.

It can be seen from Table 5 that since 2017, the water quality of Baiyan Lake has been stable at the national surface water class III-IV standard (the total phosphorus index is stable at the national surface water class III, and the total nitrogen index is stable at the national surface water class IV standard) for 4 consecutive years. The first fishing of fish in the lake area was carried out in 2019, and about 200 t of green aquatic products were obtained by combining net catching and cormorants.

TABLE 5

Change Table of Water Quality in Baiyan Lake

| Year | Total nitrogen (mg/L) | Total phosphorus (mg/L) |
|---|---|---|
| 2015 | 2.83 | 0.45 |
| 2016 | 1.82 | 0.35 |
| 2017 | 1.50 | 0.13 |
| 2018 | 1.26 | 0.19 |
| 2019 | 1.08 | 0.11 |
| 2020 | 1.36 | 0.13 |

Since the construction of the aquatic ecosystem in Baiyan Lake in 2016, the annual management and maintenance work mainly includes the cleanliness of the lake surface and partial plant harvesting in winter. The input cost is mainly the wage of management and maintenance personnel. 15 maintenance personnel are employed. The wage of each person is 5000 yuan/month. The annual maintenance cost is 600,000 yuan. The caught fish is 30 yuan/kg on average. About 4 years from 2016 to 2019, a total of 200 t fish is produced. The average annual benefit of fish is 30×200× 1000/4=1,500,000 yuan. The annual net increase is about 900,000 yuan, with the wage of 600,000 yuan/year deducted.

The ecological management project of Baiyan Lake proves that an aquatic forest may be formed by taking full advantage of the synergistic effect, nutritional relationship, food chain relationship, etc., between organisms, such that not only can the combined benefits of water quality purification and water body resource utilization be achieved, but the organic unity of environmental protection, economic development, and the improvement of people's livelihood can also be realized.

What is claimed is:

1. A micro-polluted water body ecological treatment method based on aquatic forest system construction, comprising the following steps:

(1) investigating a pollution source of a micro-polluted water body;

(2) estimating an annual pollution load of the micro-polluted water body which needs to be reduced, comprising estimating an annual total pollution load of the micro-polluted water body and estimating an annual needed reduction of the pollution load of the micro-polluted water body; wherein
the annual total pollution load of the micro-polluted water body is estimated according to Formula (1):

$$P_t = P_b + P_d + P_m + \sum_{i=1}^{n} P_i \qquad (1)$$

in Formula (1), $P_t$ is the annual total pollution load of micro-polluted water, $P_b$ is a background pollution load of micro-polluted water body, $P_d$ is an annual sediment release pollution load of the micro-polluted water body, $P_m$ is an annual overland runoff pollution load of the micro-polluted water body, P$_i$ is an annual pollution load of an i$^{th}$ point source of the micro-polluted water body, n is the number of point source pollution;

and, the annual needed reduction of the pollution load of the micro-polluted water body is estimated according to Formula (2):

$$P_C = P_t - W_{ec} \qquad (2)$$

in Formula (2),

P$_c$ is the annual needed reduction of the pollution load of the micro-polluted water body, W$_{ec}$ is a water environment capacity;

(3) designing aquatic animals and plants; and (4) constructing the aquatic animals and plants.

2. The treatment method according to claim 1, wherein the micro-polluted water body is selected from the group consisting of micro-polluted rivers, lakes, *lacus*, ponds and reservoirs.

3. The treatment method according to claim 2, wherein the step (1) of investigating a pollution source of a micro-polluted water body comprises investigating a background pollution load, a sediment release pollution load, an overland runoff pollution load and/or a point source pollution load of the micro-polluted water body.

4. The treatment method according to claim 2, wherein the step (3) of designing aquatic animals and plants comprises a submerged plant design and an aquatic animal design.

5. The treatment method according to claim 1, wherein the step (1) of investigating a pollution source of a micro-polluted water body comprises investigating a background pollution load, a sediment release pollution load, an overland runoff pollution load and/or a point source pollution load of the micro-polluted water body.

6. The treatment method according to claim 5, wherein the step (3) of designing aquatic animals and plants comprises a submerged plant design and an aquatic animal design.

7. The treatment method according to claim 1, wherein the step (3) of designing aquatic animals and plants comprises a submerged plant design and an aquatic animal design.

8. The treatment method according to claim 7, wherein the submerged plant design is a design of submerged plant species and areas according to the annual needed reduction of the pollution load of the micro-polluted water body;

the pollution load is selected from nitrogen and phosphorus nutrient salt pollution load;

the submerged plant is selected from one or more of charophytes, *Ceratophyllum demersum* L., *Hydrilla verticillata, Najas minor* All., *Myriophyllum verticillatum* L. *Elodea canadensis* Michx., dwarf type and cold-resistant *vallisneria, Vallisneria spinulosa Vallisneria natans, Potamogeton malaianus, Potamogeton pectinatus*, or *Potamogeton crispus;* the nutrient salt pollution load is estimated according to Formula (3):

$$N_r = S_p \times (x_1 x_2 \ \ldots \ x_n) \begin{pmatrix} N_1 \\ N_2 \\ \vdots \\ N_n \end{pmatrix} \qquad (3)$$

in Formula (3),

N$_r$ is an annual nutrient removal amount g/a by the submerged plants,

S$_p$ is a total area m$^2$ of the submerged plants, x$_n$ is a proportion of a submerged plant n, N$_n$ is annual nutrient removal capacity g/m$^2$·a by the submerged plant n.

9. The treatment method according to claim 8, wherein the aquatic animal design comprises one or more designs selected from:

(i) a design of releasing filter-feeding fish, (ii) a design of releasing herbivorous fish, (iii) a design of releasing carnivorous fish, (iv) a design of releasing scrape-feeding fish, (v) a design of releasing benthonic animals, and (vi) a design of releasing macrozooplankton.

10. The treatment method according to claim 7, wherein the aquatic animal design comprises one or more designs selected from:

(i) a design of releasing filter-feeding fish, (ii) a design of releasing herbivorous fish, (iii) a design of releasing carnivorous fish, (iv) a design of releasing scrape-feeding fish, (v) a design of releasing benthonic animals, and (vi) a design of releasing macrozooplankton.

11. The treatment method according to claim 10, wherein the (i) design of releasing filter-feeding fish is a *Hypophthalmichthys molitrix* releasing design; and the releasing amount of *Hypophthalmichthys molitrix* is estimated according to the following formula:

the total productivity of black and white bottles is estimated according to Formula (4):

$$P_G = DO_W - DO_B \qquad (4)$$

in Formula (4),

P$_G$ is a total O$_2$ productivity mg/L of black and white bottles,

DO$_W$ is a dissolved oxygen content mg/L in the white bottle,

DO$_B$ is a dissolved oxygen content mg/L in the black bottle;

the O$_2$ net productivity of the black and white bottles is estimated according to Formula (5):

$$P_N = DO_W - DO_I \qquad (5)$$

in Formula (5),

P$_N$ is an O$_2$ net productivity mg/L of the black and white bottles,

DO$_I$ is an initial dissolved oxygen content mg/L in the black and white bottles;

the O$_2$ daily productivity g/m$^2$·d of the water column is estimated according to Formula (6):

$$W_P = \sum_{i=1}^{n-1} \frac{P_{Ni} + P_{Ni+1}}{2} (D_{i+1} - D_i) \qquad (6)$$

in Formula (6)

W$_P$ is the O$_2$ daily production g/m$^2$·d of the water column,

P$_{Ni}$ is the net primary productivity g/m$^3$·d of an i$^{th}$ layer,

D$_i$ is a depth m of the i$^{th}$ layer, n is a sampling level;

the total O$_2$ productivity g of the water body is estimated according to Formula (7):

$$P_{GH} = W_P \times S_H \times D_G \times 0.75 \qquad (7)$$

in Formula (7),

P$_{GH}$ is the total O$_2$ productivity g of the water body,

S$_H$ is an area m$^2$ of the water body,

D$_G$ is the days of fish growth, counted as 270 days;

the feeding ability of phytoplankton to *Hypophthalmich-thys molitrix* is estimated according to Formula (8):

$$F_{SC} = P_{GH} \times (P_N/P_G) \times R_P \times T_O \qquad (8)$$

in Formula (8), $F_{SC}$ is the feeding ability of phytoplankton to *Hypoph-thalmichthys molitrix*, $R_P$ is a phytoplankton utilization rate of fish, generally taken as 0.5;

$T_O$ is a heat equivalent of oxygen, 14.686 KJ/g;

the fish yield potential of *Hypophthalmichthys molitrix* is estimated according to Formula (9):

$$F_L = F_{SC} \times E_L \times (1/C) \times 10^{-6} \qquad (9)$$

in Formula (9), $F_L$ is a fish yield potential of *Hypophthalmichthys molitrix* in tons (t), $E_L$ is a conversion rate of *Hypophthalmichthys molitrix* to phytoplankton, taken as 0.032;

C is a heat equivalent of 1 g fresh meat, 5.021 KJ.

12. The treatment method according to claim 11, wherein the (ii) design of releasing herbivorous fish is a *Cteno-pharyngodon idella* and *Parabramis pekinensis* releasing design;

the releasing quantity of *Ctenopharyngodon idella* and *Parabramis pekinensis* is estimated according to the following formula:

the submerged plant biomass in March and June is calculated with reference to an empirical model of submerged plant biomass:

$$\text{June: } W_{b6} = -3536 + 7900.6 M_{SD}/M_{DP} \qquad (10)$$

$$\text{March: } W_{b3} = -3149 + 4854.6 M_{SD}/M_{DP} \qquad (11)$$

In Formulas (10) and (11):

$W_{b3}$ is a biomass (wet weight, g/m$^2$) of submerged plants in March;

$W_{b6}$ is a biomass (wet weight, g/m$^2$) of submerged plants in June;

$M_{SD}/M_{DP}$ is a ratio of transparency to water depth for the corresponding month; and a maximum intake of herbivorous fish is measured with reference to Table 2:

TABLE 2

| Maximum intake of herbivorous fish | | |
|---|---|---|
| Submerged plant species | Maximum intake of *Ctenopharyngodon idella* | Maximum intake of *Parabramis pekinensis* |
| *Vallisneria* | $F_M = 1.923 X^{0.6489}$ | $F_M = 0.8991 X^{0.4269}$ |
| *Hydrilla verticillata* | $F_M = 2.0037 X^{0.6390}$ | $F_M = 7.6604 X^{0.3580}$ |
| *Potamogeton crispus* | $F_M = 1.762 X^{0.5236}$ | $F_M = 0.8914 X^{0.5554}$ |

In Table 2, $F_M$ is a daily intake g/d of fish;

X is a body weight kg of the fish;

the releasing quantity of herbivorous fish is estimated according to Formula (12):

$$A_F = S \times (W_{b6} - W_{b3}) \times 0.3/(F_M \times D_G) \qquad (12)$$

in Formula (12), $A_F$ is a releasing quantity of herbivorous fish, calculated by the number of fish;

S is a planting area m$^2$ of the submerged plants;

$D_G$ is the days of herbivorous fish growth, counted as 270 days;

the releasing ratio of *Parabramis pekinensis* to *Cteno-pharyngodon idella* is about 10:1.

13. The treatment method according to claim 11, wherein the (iii) design of releasing carnivorous fish is a releasing design of one or more fish selected from the group consisting of: *Siniperca chuatsi, Lateolabrax japonicus, Elopichthys bambusa* and *Channaargus*; the releasing quantity of the carnivorous fish is 10-15 fish per mu;

the (iv) design of releasing scrape-feeding fish is a *Xeno-cypris* releasing design, wherein the releasing quantity of the *Xenocypris* is 35-40 fish per mu;

the (v) design of releasing benthonic animals is a releasing design of one or more benthonic animals selected from the group consisting of spiral shells, mussels and shrimps;

the spiral shell is *Bellamya*, wherein the releasing quantity of the *Bellamya* is 80-160 per m$^2$;

the releasing quantity of the mussel is 4-5 per m$^2$;

the releasing quantity of freshwater shrimps is 0.5-5 g/m$^2$;

the (vi) design of releasing macrozooplankton is a *Daph-nia magna* releasing design, wherein the releasing density of *Daphnia magna* is 10-30/L; and the treatment method further comprises a step (5) of management and maintenance.

14. The treatment method according to claim 10, wherein the (ii) design of releasing herbivorous fish is a *Cteno-pharyngodon idella* and *Parabramis pekinensis* releasing design;

the releasing quantity of *Ctenopharyngodon idella* and *Parabramis pekinensis* is estimated according to the following formula:

the submerged plant biomass in March and June is calculated with reference to an empirical model of submerged plant biomass:

$$\text{June: } W_{b6} = -3536 + 7900.6 M_{SD}/M_{DP} \qquad (10)$$

$$\text{March: } W_{b3} = -3149 + 4854.6 M_{SD}/M_{DP} \qquad (11)$$

In Formulas (10) and (11):

$W_{b3}$ is a biomass (wet weight, g/m$^2$) of submerged plants in March;

$W_{b6}$ is a biomass (wet weight, g/m$^2$) of submerged plants in June;

$M_{SD}/M_{DP}$ is a ratio of transparency to water depth for the corresponding month; and a maximum intake of herbivorous fish is measured with reference to Table 2:

TABLE 2

| Maximum intake of herbivorous fish | | |
| --- | --- | --- |
| Submerged plant species | Maximum intake of Ctenopharyngodon idella | Maximum intake of Parabramis pekinensis |
| Vallisneria | $F_M = 1.923X^{0.6489}$ | $F_M = 0.8991X^{0.4269}$ |
| Hydrilla verticillata | $F_M = 2.0037X^{0.6390}$ | $F_M = 7.6604X^{0.3580}$ |
| Potamogeton crispus | $F_M = 1.762X^{0.5236}$ | $F_M = 0.8914X^{0.5554}$ |

In Table 2, $F_M$ is a daily intake g/d of fish;

X is a body weight kg of the fish;

the releasing quantity of herbivorous fish is estimated according to Formula (12):

$$A_F = S \times (W_{b6} - W_{b3}) \times 0.3/(F_M \times D_G) \qquad (12)$$

in Formula (12), $A_F$ is a releasing quantity of herbivorous fish, calculated by the number of fish;

S is a planting area m² of the submerged plants;

$D_G$ is the days of herbivorous fish growth, counted as 270 days;

the releasing ratio of Parabramis pekinensis to Ctenopharyngodon idella is about 10:1.

15. The treatment method according to claim 14, wherein the (iii) design of releasing carnivorous fish is a releasing design of one or more fish selected from the group consisting of: Siniperca chuatsi, Lateolabrax japonicus, Elopichthys bambusa and Channaargus; the releasing quantity of the carnivorous fish is 10-15 fish per mu;

the (iv) design of releasing scrape-feeding fish is a Xenocypris releasing design, wherein the releasing quantity of the Xenocypris is 35-40 fish per mu;

the (v) design of releasing benthonic animals is a releasing design of one or more benthonic animals selected from the group consisting of spiral shells, mussels and shrimps;

the spiral shell is Bellamya, wherein the releasing quantity of the Bellamya is 80-160 per m²;

the releasing quantity of the mussel is 4-5 per m²;

the releasing quantity of freshwater shrimps is 0.5-5 g/m²;

the (vi) design of releasing macrozooplankton is a Daphnia magna releasing design, wherein the releasing density of Daphnia magna is 10-30/L; and the treatment method further comprises a step (5) of management and maintenance.

16. The treatment method according to claim 10, wherein the (iii) design of releasing carnivorous fish is a releasing design of one or more fish selected from the group consisting of: Siniperca chuatsi, Lateolabrax japonicus, Elopichthys bambusa and Channaargus; the releasing quantity of the carnivorous fish is 10-15 fish per mu;

the (iv) design of releasing scrape-feeding fish is a Xenocypris releasing design, wherein the releasing quantity of the Xenocypris is 35-40 fish per mu;

the (v) design of releasing benthonic animals is a releasing design of one or more benthonic animals selected from the group consisting of spiral shells, mussels and shrimps;

the spiral shell is Bellamya, wherein the releasing quantity of the Bellamya is 80-160 per m²;

the releasing quantity of the mussel is 4-5 per m²;

the releasing quantity of freshwater shrimps is 0.5-5 g/m²;

the (vi) design of releasing macrozooplankton is a Daphnia magna releasing design, wherein the releasing density of Daphnia magna is 10-30/L; and the treatment method further comprises a step (5) of management and maintenance.

* * * * *